United States Patent
Tabler et al.

[15] 3,668,265
[45] June 6, 1972

[54] DISPROPORTIONATION OF ALKYLBENZENES

[72] Inventors: Donald C. Tabler; Marvin M. Johnson, both of Bartlesville, Okla.

[73] Assignee: Phillips Petroleum Company

[22] Filed: Jan. 14, 1970

[21] Appl. No.: 2,971

[52] U.S. Cl............................................260/672 T, 252/464
[51] Int. Cl..........................................................C07c 3/62
[58] Field of Search........................260/672, 672 T; 252/464

[56] References Cited
UNITED STATES PATENTS

| | | | |
|---|---|---|---|
| 2,783,185 | 2/1957 | Hughes et al. | 252/464 |
| 3,338,952 | 8/1967 | Callahan et al. | 252/464 |
| 3,347,902 | 10/1967 | Grasselli et al. | 252/464 |
| 3,392,001 | 7/1968 | Lorenz et al. | 252/464 |
| 3,417,157 | 12/1968 | Pollitzer | 260/672 |

*Primary Examiner*—Curtis R. Davis
*Attorney*—Young and Quigg

[57] ABSTRACT

Disproportionation of alkylbenzenes is promoted by the use of catalysts prepared from antimony salts, optionally with cobalt or nickel salts, on alumina.

11 Claims, No Drawings

DISPROPORTIONATION OF ALKYLBENZENES

Our invention relates to the disproportionation of alkylbenzenes. In another aspect, our invention relates to catalysts to effectuate disproportionation reactions of alkylbenzenes.

In modern petrochemical operations, aromatic hydrocarbons and particularly the alkyl aromatic hydrocarbons are desired for a variety of chemical processes, such as preparation of intermediates for polymer formation.

Crude oils are of a widely varying composition, and hence result in varying amounts of BTX, i.e., benzene, toluene, and the xylenes, as well as other alkylbenzenes. The wide variety of processing conditions for the crude oils, including cracking, reforming, and the like, also result in various amounts and proportions of the aromatics.

It is often desirable to convert available alkylbenzenes to products of greater and lesser numbers of alkyl groups, particularly if such conversion can be accomplished without loss of aromaticity, i.e., with little or no formation of non-aromatic components either through severance of the benzene ring or through hydrogenation of the benzene ring to cycloparaffins. Undesired conversion of aromatics to non-aromatics complicates recovery and purification operations, as well as being wasteful of the valuable aromatic components.

We have discovered that catalysts composed of antimony on an alumina, optionally together with either cobalt or nickel or both, are effective in the disproportionation of toluene or other alkylbenzenes substantially without formation of non-aromatics.

It is an object of our invention to improve the promotion of disproportionation reactions of alkylbenzenes. It is a further object to provide unique catalysts. Other aspects, objects, and the several advantages of this invention will be apparent to one skilled in the art from the following description and appended claims.

The reaction to which we refer can be illustrated by:

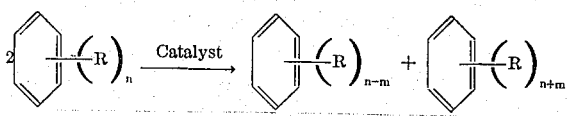

in which R is an alkyl group having from one to about three carbon atoms, including methyl, ethyl, n-propyl, and isopropyl; $n$ is an integer in the range of from 1 to 4; and $m$ is either 1 or 2.

The catalysts which we have discovered and applied to disproportionation reactions include antimony on alumina, antimony with cobalt on alumina, antimony with nickel on alumina, and antimony with both cobalt and nickel on alumina. The alumina can be selected from any of the aluminas including fluoride compound-treated aluminas, as well as alumina combined with zirconia, titania, boria, or beryllia; though preferably eta- or gamma-alumina are used; and the term alumina should be so considered herein.

Our catalysts can contain from 1 to 20 weight per cent of antimony based on the total alumina-containing composition, though more preferably from 1 to 10 weight per cent antimony. The catalysts further can contain cobalt or nickel or both, which result in improved effectiveness and lengthened life of the catalysts. Cobalt content can be from about 1 to 15 weight per cent, though more preferably 5 to 10 weight per cent. The nickel content also can range from about 1 to 15 weight per cent, though more preferably from 5 to 10 weight per cent. When the catalyst contains both cobalt and nickel, the combined amount of the two components can range from about 1 to 15 weight per cent of the total catalyst composition, again more preferably from 5 to 10 weight per cent. All of these values are of the constituent or constituents relative to the total weight of the catalyst composition. The state of the antimony, whether as the metal or in a combined state on the alumina, is not at present determinable. Therefore, in using the term antimony with reference to our prepared catalysts, we do not intend to limit to elemental antimony. Similarly, as to the cobalt and nickel components of our catalysts.

The effectiveness of our catalysts is illustrated by runs shown in the following examples which illustrate application of our catalysts to the disproportionation processes; and further show one method of preparation of our catalysts.

EXAMPLE I

A run was made utilizing an antimony on alumina catalyst, without the inclusion of cobalt or nickel. This catalyst was prepared by adding slowly 26 g (gram) of antimony pentachloride $SbCl_5$ to deionized water stirring, and the solution cooled in an ice bath. The mixture was blended with 50 g of alumina to form a smooth paste. The alumina used was gamma-alumina, a very finely divided flame hydrolized alumina prepared by reaction of aluminum chlorides with air at high temperatures. 28 per cent ammonia water was added slowly, with stirring, until the admixture was slightly alkaline. The composition was dried at 210° F. The dried material was crushed and screened to 10 to 40 mesh; calcined in air at 800° F. for 2 hours; then reduced in hydrogen at 875° F. for 16 hours. In this run, the alkylbenzene feed was toluene, further containing 0.7 volume per cent chloroform. Process conditions included 1.33 LHSV (liquid hourly space velocity), 912° F., 505 psig, and a hydrogen to hydrocarbon mole ratio of 0.92. Test results are shown after 1 hour of operation, and after 4 hours:

TABLE I

| | After 1 hour | After 4 hours |
|---|---|---|
| Conversion %[1] | 26.72 | 16.49 |
| Effluent analysis %[1] | | |
| Benzene | 12.72 | 8.30 |
| Toluene | 74.28 | 83.51 |
| m- and p-xylenes | 9.95 | 6.38 |
| o-xylene | 2.97 | 1.78 |
| Trimethylbenzenes | nil | nil |
| Total | 99.93 | 99.97 |

[1] Flame ionization detection determined gas liquid chromatographic area percents (proportional to carbon percent) which are close approximations of weight percents.

The antimony on alumina catalyst is shown to be quite effective with good conversion. Further, no detectable amounts of non-aromatics were formed, nor trialkyl products, in this run with the use of our catalysts for disproportionation.

EXAMPLE II 33.9 g (0.136 mole) of cobalt acetate tetrahydrate was dissolved in approximately 225 ml (milliliters) of deionized water, and the solution cooled in a wet ice bath. To this mixture was slowly added 13 ml of antimony pentachloride $SbCl_5$ with stirring. A whitish precipitate formed in slight amount. The mixture so formed was then blended with 70 g of gamma-alumina to form a smooth paste. To this paste was slowly added 65 ml of 28 per cent ammonia solution, with stirring, such that the resulting paste was slightly alkaline to litmus paper. The color of the mixture changed from light pink to a pink-purple color. This composition was then dried at 210° F. for 5 days; crushed and screened to 10 to 40 mesh; calcined in air at 900° F. for 3 hours and at 1,000° F. for 3 hours; and reduced in hydrogen at 800° F. for 2 hours. The composition, a bright blue after calcination, turned black after reduction.

The catalyst so prepared was placed in a reaction zone and contacted with a toluene stream containing 0.7 per cent by volume $CHCl_3$. Process conditions included a hydrogen stream such that a hydrogen to hydrocarbon mole ratio of 1.15 was effected at 1.3 ml/ml/hr LHSV; a temperature of 900° to 910° F.; and a pressure of 500 psig.

After 4 hours operation under these conditions, the conversion was 29.31 per cent and the effluent stream had the following composition:

TABLE II

| Component | Area %[2] |
|---|---|
| Benzene | 15.14 |
| Toluene | 70.69 |
| m- and p-xylenes | 11.08 |
| o-Xylene | 2.69 |
| Trimethylbenzenes | 0.37 |
| Total | 99.97% |

[2]Refer Note 1 in Example I.

Comparing the 4-hour effluent analysis of Table I with the data in Table II, which also was taken at the end of a 4-hour operating cycle, the initial and later effectiveness of the antimony-cobalt-alumina catalyst is improved compared to the antimony-alumina catalyst of Example I. The inclusion of the cobalt improves catalyst life and per cent conversion of the alkylbenzene.

Particularly noteworthy of the runs in both examples is the effective conversion to xylenes and benzene, without formation of paraffin products. And, only a relative trace of trialkylbenzene was produced in Example II. The unconverted toluene, of course, can be separated and recycled for additional conversion.

CATALYST PREPARATION-ACTIVATION

For the preparation of our catalysts, a convenient, effective, and presently preferred method is illustrated by Examples I and II above. However, any method resulting in the catalysts of our composition would be encompassed in our invention.

Examples of suitable antimony salts include antimony trifluoride, antimony pentafluoride, antimony trichloride sometimes known as butter of antimony, antimony pentachloride, and combinations of antimony with an organic component such as antimony tartrate, or double salts with an alkali metal such as antimony potassium tartrate. With the antimony trisalts, addition thereof to water tends to result in a slight precipitation which is not objectionable, since the solution will be made into a mixture with the substrate, and the entire admixture including substrate then dried to form the catalysts of our invention. This method of preparation is particularly useful because of the ease of handling and lack of necessity to perform expensive separation steps, such as filtration, centrifuging, and the like.

Examples of suitable cobalt salts include cobaltic acetate, cobaltous acetate, cobaltous benzoate, cobaltous bromate, cobaltous bromide, cobaltous chlorate, cobaltous chloride, cobaltic chloride; the equivalent salts of fluorine and iodine; the formate, nitrate, propionate, sulfate, and even complex salts such as aquapentamminecobalt (III) chloride.

Examples of nickel salts include nickel bromide, nickel perchlorate, nickel chloride, nickel iodide, nickel nitrate, nickel sulfate, and even complex nickel salts such as hexamminenickel (II) bromide and the like. Nickel salts of organic compounds such as nickel benzenesulfonate are suitable.

The desired cobalt or nickel salt is dispersed in water, and the antimony salt added directly thereto; or the antimony salt can first be mixed with or dispersed in a small amount of water and the resulting dispersion then added to a dispersion of the cobalt or nickel salt. Preferably, the salts are water soluble. Preferably the amount of water used is controlled in the antimony, or cobalt-antimony, or nickel-antimony, or cobalt-nickel-antimony, salt admixture such that a paste or easily handled relatively thick mixture is formed when the substrate is added. While thinner mixtures are suitable, with additional water, this is unnecessary and only results in additional energy expenditures to evaporate the excess water. Usually, the alumina substrate used is finely divided.

Neutralization of the admixture can be with any suitable alkaline material such as ammonia, ammonia water or ammonium hydroxide, or amines such as morpholine, cyclohexylamine, and the like. Ammonium hydroxide or an amine are preferable since such will volatilize upon heating of the neutralized complex. However, alkali metal hydroxides such as sodium hydroxide, potassium hydroxide, lithium hydroxide, alone or in combination, can be used to neutralize the complex mixture; after initial drying, the complex so treated, however, requires washing to remove any excess alkali metal hydroxide present. Such a washing step can be omitted where a volatile alkaline material is used for neutralization.

After drying, the catalyst is calcined. Suitable calcination temperatures can range from about 800° to 1,200° F., though higher temperatures are not objectionable. Thereafter, the calcined catalyst is reduced in a stream of hydrogen at a temperature of from about 800° to 1,000° F. The catalyst then is ready for use in processes such as described.

DISPROPORTIONATION CONDITIONS

The disproportionation reaction can be conducted in any suitable reactor. A fixed bed, moving bed, or fluidized bed of catalyst can be used. Reaction conditions for disproportionation include a temperature of from about 700° to 1,000° F., though preferably from 800° to 950° F.; a pressure of from about 100 to 2,000 psig, though preferably from 300 to 1,000 psig. Space velocities normally will range from about 0.1 to 20 volumes of liquid hydrocarbon feed per volume of catalyst per hour, though more preferably between 0.5 and 2 are employed. Hydrogen, optionally employed in the reaction for improved conversion, is used in a hydrogen:hydrocarbon feed ratio of from about 0.5:1 to 10:1 moles of hydrogen per mole of hydrocarbon, more usually 1:1 to 4:1. Diluents, known to the art, and which are inert under the reaction conditions, can be employed, if desired.

The feed of a halogen-containing compound improves the effectiveness of the catalysts in the disproportionation process. A hydrogen halide HX can be fed where X can be selected from chlorine, fluorine, bromine, or iodine. A compound of the hydrocarbyl halide $R'X_p$ type also can be utilized, in which X is the same as just described, and R' can be any hydrocarbyl radical including alkyl, alkaryl, aralkyl, cycloalkyl, aryl, cycloalkylalkyl, alkylcycloalkyl, or alkenyl that reacts under process conditions to produce HX. R' can contain from one to about 10 carbons, though more usually a lower range of from one to about four carbon atoms is utilized for convenience. The hydrocarbyl radical can be olefinically unsaturated, if desired, as this is not objectionable. In the formula $R'X_p$, $p$ is an integer and can range from 1 to about 4. More than 4 halogen atoms per molecule are not objectionable; however, with increasing numbers of halogen atoms, the molecule becomes progressively heavier, and volatility problems are encountered.

Examples of suitable hydrocarbyl halides $R'X_p$ can include:
chloroform
carbon tetrachloride
bromomethane
fluoromethane
iodomethane
dibromomethane
1-chlorodecane
1-chloro-10-fluorodecane
1-bromo-2-chloro-9-fluoro-10-iododecane
1-fluoro-3-methyloctane
3-chlorobutylbenzene
bromomethylbenzene
1-bromomethyl-2,3,5-trichlorobenzene
1-butyl-4-chlorobenzene
1-chlorocyclohexane
1-bromo-2,4-dichlorocyclodecane 1,2,4,5-tetrabromobenzene
chlorobenzene
2-chloronaphthalene
1-bromo-4-butylcyclohexane
4-chlorobutylcyclohexane
1-iodo-4-(4-chlorobutyl)cyclohexane
vinyl chloride
1-chloro-3-hexene
1-fluoro-3-iodo-5-decene,
and the like.

The amount of halogen-containing compound employed should be such that the halogen content in the feed to the reaction zone is in the range of from about 50 to 10,000 parts per million by weight of halogen relative to the feed of hydrocarbon, excluding hydrogen and any diluent.

Normally, it is preferable to avoid the use of free halogen gases such as fluorine, chlorine, bromine, iodine. While such are operable within the framework of our process, yet the tendency is to result in halogenation losses of the hydrocarbon feedstock. Further, free bromine and iodine are highly corrosive to the reactor itself. Nevertheless, since such are operable, the term halogen-containing compound is intended to include the free halogens.

CATALYST REACTIVATION

The catalyst to be reactivated after a time on stream is calcined in the presence of oxygen or an oxygen-containing stream, at a temperature similar to the range as used for initial preparation-activation. Calcination is followed by reduction with hydrogen as described under catalyst regeneration-activation. Following reduction, treatment with HX or $R'X_p$ should be applied in order for the catalyst to be most promptly active for disproportionation. It is possible to omit the treatment of the catalyst with HX or $R'X_p$, and to use the catalyst immediately for disproportionation, by feeding a halogen-containing compound to the reactor, either with the hydrocarbon feed or separately, so as to complete the reactivation of the catalyst. However, such method in practice is preceded with an interval or lag time during which the catalyst is not active or at least not fully active. Therefore, it is preferable for the halogen treatment to be applied to the reduced catalyst near the end of the reduction with hydrogen, or even subsequent to the reduction with hydrogen, in order for the catalyst to be fully active for the disproportionation process.

The foregoing discussion and examples have illustrated the effectiveness of our catalysts, particularly the effectiveness of our catalysts relative to their use in disproportionation processes. Reasonable variations and modifications of our invention are possible within the scope of our disclosure without departing from the scope and spirit as disclosed in this specification and claims.

We claim:

1. An antimony on alumina catalyst composition consisting essentially of reduced antimony or antimony compound and further containing at least one of cobalt or nickel, said alumina selected from at least one of an alumina, a fluoride compound-treated alumina, and an alumina combined with at least one of zirconia, titania, boria, beryllia combinations thereof, and mixtures thereof, wherein said antimony on alumina catalyst composition contains from about 1 to about 20 weight per cent of said antimony, and from about 1 to 15 weight per cent of said cobalt or nickel.

2. A catalyst according to claim 1 wherein said catalyst contains from about 1 to about 10 weight per cent of said antimony, and from about 5 to about 10 weight per cent of at least one of said cobalt and nickel.

3. A method of preparing a catalyst comprising antimony on alumina, said alumina selected from at least one of an alumina, a fluoride compound-treated alumina, and an alumina combined with at least one of zirconia, titania, boria, beryllia, combinations thereof, and mixtures thereof, wherein said catalyst contains from about 1 to about 20 weight per cent of said antimony, said catalyst further containing at least one of cobalt and nickel such that said catalyst contains from about 1 to about 15 weight per cent of at least one of said cobalt and nickel, said method comprising the steps of:

a. bringing together in aqueous dispersion a salt of said antimony, a salt of at least one of said cobalt and nickel, and said alumina,
b. neutralizing said dispersion with an alkaline material,
c. dewatering said dispersion, thereby leaving a dried composition,
d. calcining said dried composition,
e. reducing said calcined composition in the presence of hydrogen, and thereby producing said catalyst.

4. A method of preparing said catalyst according to claim 3 wherein said antimony salt is a water soluble antimony salt; said salt of at least one of cobalt and nickel is a water soluble salt; and wherein said neutralizing step is accomplished by utilizing at least one of ammonia, a strongly basic amine, and an alkali metal hydroxide.

5. A method of preparing said catalyst composition according to claim 4 wherein the neutralizing step is accomplished with at least one alkali metal hydroxide, and the neutralized composition is washed so as to substantially remove excess alkali metal hydroxide.

6. A process for the disproportionation of alkylbenzenes which comprises contacting at least one alkylbenzene with a catalyst selected from at least one of antimony on an alumina substrate, antimony and cobalt on an alumina substrate, antimony and nickel on an alumina substrate, and antimony and cobalt and nickel on an alumina substrate, under disproportionation conditions.

7. A process according to claim 6 wherein said alumina substrate is selected from at least one of alumina, fluoride compound-treated alumina, alumina combined with at least one of zirconia, titania, boria, and beryllia, combinations thereof, and mixtures thereof.

8. A process according to claim 6 wherein said alkylbenzene is represented by the formula

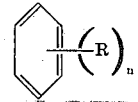

wherein R is an alkyl group having from one to about three carbon atoms, n is an integer in the range of from 1 to 4, and wherein the products of said disproportionation include

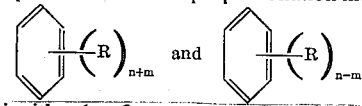

wherein m is either 1 or 2.

9. A process according to claim 8 wherein said disproportionation conditions include from about 1:1 to about 10:1 moles of hydrogen per mole of hydrocarbon feed, a reaction zone temperature of from about 700° to about 1,000° F., a reaction zone pressure of from about 100 to about 2,000 psig, and a space velocity of from about 0.1 to about 20 volumes of liquid feed per volume of catalyst per hour.

10. A process according to claim 9 wherein further is employed a halogen-containing compound in an amount constituting from about 50 to about 10,000 parts per million by weight as halogen relative to said alkylbenzene.

11. A process according to claim 10 wherein said halogen-containing compound is selected from at least one of HX and $R'X_p$ wherein X is selected from at least one of fluorine, chlorine, bromine, and iodine, R' is a hydrocarbyl radical containing from one to about 10 carbon atoms, and p is an integer of from 1 to about 4.

* * * * *